US006757446B1

(12) United States Patent
Li et al.

(10) Patent No.: US 6,757,446 B1
(45) Date of Patent: Jun. 29, 2004

(54) SYSTEM AND PROCESS FOR IMAGE-BASED RELATIVISTIC RENDERING

(75) Inventors: Jiang Li, Beijing (CN); Heung-Yeung Shum, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 529 days.

(21) Appl. No.: 09/724,207

(22) Filed: Nov. 27, 2000

(51) Int. Cl.[7] .................................................. G06T 3/00
(52) U.S. Cl. ...................................... 382/293; 345/647
(58) Field of Search ............................... 382/276, 100, 382/293; 345/418, 646, 647

(56) References Cited

FOREIGN PATENT DOCUMENTS

JP           03294978 A  * 12/1991  ........... G06F/15/72

OTHER PUBLICATIONS

Hsiung et al. "Visualizing Relativistic Effects in Spacetime." Proc. of the ACM/IEEE Conf. on Supercomputing, 1989, pp. 597–606.*
Hsiung et al. "Spacetime Visualization of Relativistic Effects." Proc. of the ACM Annual Conf. on Computer Science, 1990, pp. 236–243.*
Hsiung et al. "Time Dilation Visualization in Relativity." Proc. of Supercomputing '90, Nov. 12, 1990, pp. 835–844.*
Chang et al. "Image Shading Taking into Account Relativistic Effects." ACM Trans. on Graphics, vol. 15, No. 4, Oct. 1996, pp. 265–300.*
Weiskopf et al. "Searchlight and Doppler Effects in the Visualization of Special Relativity: A Corrected Derivation of the Transformation of Radiance." ACM Trans. on Graphics, vol. 18, No. 3, Jul. 1999, pp. 278–292.*
Weiskopf et al. "Real–World Relativity: Image–Based Special Relativistic Visualization." Proc. Visualization 2000, Oct. 8, 2000, pp. 303–310.*
Weiskopf et al. "Four–Dimensional Non–Linear Ray Tracing as a Visualization Tool for Gravitational Physics." Proc. Visualization 2000, Oct. 8, 2000, pp. 445–448.*

* cited by examiner

Primary Examiner—Jon Chang
(74) Attorney, Agent, or Firm—Lyon & Harr, LLP; Mark A. Watson (57) ABSTRACT

The present invention involves a new system and process for image-based relativistic rendering of one or more single or sequential images of a scene. Such images may be produced by any conventional method, and include, for example, photographs, panoramas, motion video or film, or any other type of image captured by a camera or other image capture device. Relativistic rendering in accordance with the present invention transforms one or more initial images to produce photo-realistic images that accurately simulate how the scene would be viewed by an observer that is traveling at any desired velocity up to the speed of light. These rendered images are equal in resolution and quality to the initial images. Such relativistic simulation is based on Einstein's Special Theory of Relativity. Further, unlike previous techniques, relativistic rendering in accordance with the present invention does not depend upon artificial or synthetic models, or upon ray-tracing methods. Consequently, the computer power required for relativistic rendering in accordance with the present invention is considerably less than that required for the previous techniques that rely on such methods.

39 Claims, 5 Drawing Sheets

SYSTEM AND PROCESS FOR IMAGE-BASED RELATIVISTIC RENDERING

BACKGROUND

1. Technical Field

The invention is related to a system and process for image-based relativistic rendering, and more particularly, to a system and process for transforming images to accurately simulate how a scene would be viewed by an observer that is traveling at any desired velocity up to the speed of light.

2. Related Art

In recent years, numerous image modeling and rendering techniques have been developed for generation of a large variety of special effects. Such techniques have been employed in areas such as manipulation or synthesis of single images, or of motion video or film sequences, and for generation of special effects for electronic games. However, currently available techniques do not have the capability to realistically display an image or scene as it would be viewed by an observer traveling at relativistic velocities. For example, in some science-fiction movies and computer games, a spacecraft or other object may move with a speed comparable to that of light, but nothing in its shape, brightness, color, or shadow shows the consequences of Einstein's Special Theory of Relativity.

Previously, a special ray tracing technique [1] called REST has been used to describe relativistic effects in space-time on synthetic or artificial models. According to the REST-frame algorithm [2, 3, 4, 5], objects, light sources and cameras that may rest at different inertial reference frames are modeled. The tracing rays are transformed to different inertial reference frames. Intersection tests and light illumination calculations are then performed for the rays. As a result, a series of phenomena such as length contraction, time dilation [6] and Doppler shift effects [7, 8] have been visualized.

Further, a technique for shading of high-speed moving objects has also been used. This technique operates by transforming all the objects and light sources to the inertial reference frame of a camera [9]. However, as with the aforementioned REST technique, this shading technique also depends on synthetic or artificial models.

One problem with both the REST-frame technique and the shading technique is that both require ray tracing procedures and scene data structures that can only be applied to special synthetic models constructed in their own systems. Therefore, these existing techniques are not competent for transforming existing images to show relativistic effects over a range of velocities up to the speed of light. Another problem with these techniques is that the ray-tracing methods employed are computer intensive functions. In other words, they take a relatively large amount of computer power and time to render an image from the synthetic or artificial models employed. Further, because both techniques use artificial or synthetic models, the images that they produce tend to look artificial, and thus less photo-realistic than is typically desired.

Consequently, what is needed is a technique for transforming existing images to show relativistic effects without the need for synthetic or artificial models. Further, such a technique should be able transform an image with considerably less computer power than that required for the ray-tracing methods employed by the techniques described above. Finally, such a technique should be able to produce photo-realistic images.

It is noted that in the preceding paragraphs, the description refers to various individual publications identified by a numeric designator contained within a pair of brackets. For example, such a reference may be identified by reciting, "reference [1]" or simply "[1]". Multiple references are identified by a pair of brackets containing more than one designator, for example, [5, 6, 7]. A listing of the publications corresponding to each designator can be found at the end of the Detailed Description section.

SUMMARY

The present invention involves a new system and process for image-based relativistic rendering of one or more single or sequential images of a scene. Such images may be produced by any conventional method, and include, for example, photographs, panoramas, motion video or film, or any other type of image captured by a camera or other image capture device. Relativistic rendering in accordance with the present invention transforms one or more initial images to produce photo-realistic images that accurately simulate how the scene would be viewed by an observer that is traveling at any desired velocity up to the speed of light. These rendered images are equal in resolution and quality to the initial images. Therefore, given a photo-realistic input image, a photo-realistic rendered image is generated. Such relativistic simulation is based on Einstein's Special Theory of Relativity. Further, unlike previous techniques, relativistic rendering in accordance with the present invention does not depend upon artificial or synthetic models, or upon ray-tracing methods.

In fact, in stark contrast to the present invention, traditional methods of ray tracing for rendering images are based on a determination of very complex light interactions, with the ultimate goal of finding the color, shade, or intensity of each point in a view window. In general, ray tracing is based on the idea that reflection and refraction of light rays can be modeled by recursively following the path that light takes as it bounces through an environment. Traditionally, this path is determined from a point within the view window towards an object and then a light source that illuminates the object within the scene. Consequently, using basic principles of reflection and refraction, the color, shade, or intensity of pixels in a final image can be determined by tracing a plurality of light rays as they are reflected and refracted while traveling through a scene comprised of three dimensional models or objects. In other words, ray tracing is used to simulate the path that light rays take as they bounce around within the world, i.e. they are traced through a scene comprised of three-dimensional objects or models. The three-dimensional objects or models are either non-transparent, thus requiring a consideration of reflection of light rays, or partially or fully transparent, thus requiring a consideration of refraction of light rays.

When using traditional ray tracing techniques, if an object is reflective, a new reflected light ray is simply traced from the point of intersection with the object towards the direction of reflection. The reflected ray is the mirror image of the original ray, pointing away from the surface, with the angle of reflection equivalent to the angle of incidence. Further, if the object is to some extent transparent, then a refracted ray is traced into the surface of the object, with the light ray continuing through at least a portion of the object. If the materials on either side of the surface of the object have different indices of refraction, such as air on one side and water on the other, then the refracted ray will be bent to some degree. Expanding on these general principles, it is clear that the process of ray tracing becomes increasingly complex as multiple light sources are considered, and as multiple objects or models, having various degrees of transparency are used to populate a scene to be rendered using ray tracing. Consequently, ray tracing techniques tend to be computationally expensive.

In contrast, the relativistic rendering techniques of the present invention are not concerned with either the reflection or refraction of light rays, and further, as mentioned above, the techniques of the present invention do not require the use of artificial models or objects. Consequently, the computer power required for relativistic rendering in accordance with the present invention is considerably less than that required for the previous methods such as ray tracing.

In general, an image or picture of a scene actually records a group of light rays going through the optical center of the lens of a camera in a particular instant. For the purposes of this invention, each image pixel is considered to represent a single corresponding light ray. Thus, recording an image in any given initial inertial reference frame produces a set of rays relative to that initial reference frame. Each of these rays is then processed using the Lorentz transformation to synthesize a novel view from a new inertial reference frame. This new inertial reference frame may have any desired observational parameters. These parameters may include the observational speed and direction (i.e. the speed and direction of the new reference frame), as well as other conventional viewing parameters such as the angle and rotation of view, field of view and viewing aspect. Further, while the viewing parameters are unique to each reference frame, the origin from which the scene is viewed in each inertial reference frame is identical. In other words, the space-time point of the optical center of the lens in the initial inertial reference frame coincides with the point from which the scene is viewed in the new inertial reference frame. Consequently, choosing the light rays within a view port of an observer in the new reference frame results in a novel view of the scene, which has undergone relativistic transformations. As a result, photo-realistic synthesis of relativistic effects such as view deformation and Doppler shift of an image captured at conventional speeds using conventional methods is achieved by the present invention.

Specifically, one or more images captured in an initial inertial reference frame S, along with the parameters defining how each image was captured, are provided to an Image-Based Relativistic Rendering (IBRR) system. Parameters defining how each image was captured include information such as angular shift of the camera, field of view of the camera, and the aspect of the camera image relative to the origin of the S reference frame. In addition, viewing parameters chosen by a user are also provided to the IBRR system via a user interface. Further, this input may also be provided in other ways, such as, for example, use of a look-up table to provide parameters, random generation of parameters, computer generated parameters based on pre-determined criteria, etc. These viewing parameters represent a virtual observer in a new inertial reference frame S', and include information such as relative velocity between the S and S' reference frames, the direction of the relative velocity, the angular shift of the virtual observer, the field of view of the virtual observer, and the aspect of the image as viewed by the virtual observer relative to a common origin between the S and S' reference frames. The IBRR system then transforms each image so that it appears as it would if the virtual observer in the S' reference frame had actually acquired the image while viewing the scene at any desired viewing angle, orientation and velocity.

For convenience, the coordinate systems in S and S' are preferably chosen so that their xyz- and x'y'z'-axes, respectively, are parallel, and their origins O and O', respectively, coincide with each other when the image is acquired by the camera at time t=t'=0. However, non-parallel axes may also be used. In the event that non-parallel axes are used, conventional calculations are applied to convert the direction, orientation and origin of light rays in the S reference frame to their corresponding direction, orientation and origin relative to the S' reference frame.

In transforming an image, four coordinate systems are considered, two for each inertial reference frame. First, a global ground coordinate system relative to the scene being captured defines the initial inertial reference frame, i.e. the S reference frame. Second, a local camera coordinate system defines the orientation of the camera relative to the global ground coordinate system of the S reference frame. Third, a global observer coordinate system defines the new inertial reference frame, i.e. the S' reference frame. Fourth, a local observer coordinate system defines the orientation of the virtual observer within the global observer coordinate system of the S' reference frame.

Initially, to simplify subsequent calculations, the directions of both the camera and the virtual observer are oriented along the negative z-axis of the global ground coordinate system and the negative z'-axis of the global observer coordinate system, respectively. Consequently, the local coordinate systems of the camera and the observer coincide with the global ground coordinate system and the global observer coordinate system, respectively. However, alignment along any axis may be used; the negative z-axis is simply chosen for convenience. A new orientation, i.e. the local coordinate system, of the camera or the virtual observer is then specified by a group of angular shifts about the xyz- or x'y'z'-axes, respectively. The order of rotation, for example rotation about the x-axis, y-axis, then z-axis, or rotation about the z-axis, y-axis, then x-axis, etc. may also be used so long as the corresponding rotation matrixes described herein are properly constructed.

A unique unit 3D vector of the direction of an incoming light ray corresponding to each individual pixel in an observer's view is determined using the row and column numbers of the pixel, the field of view, the width and height of the image in the observer's view, and the point from which the scene is viewed. Based on the Lorentz velocity transformation, the unit vector of the direction of the light ray measured in the global reference frame of the ground is then determined. The direction of the incoming light ray, when viewed from the local coordinate system of the camera, is then computed. This direction is then used to determine the corresponding pixel in the original, untransformed, image by mapping the position of each of the pixels in the original image to the location in the S' reference frame where each of the light rays representing those pixels intersects a view port or viewing plane of the observer in the new reference frame. The end result is a relativistically transformed pixel-based image having the same resolution and quality as the original input image. However, when images are transformed to show the effect of relativistic velocities, an original rectangular image will map to an image having curved edges. Further, as the relativistic velocity increases, the deformation of the shape of the original image naturally increases. Consequently, in one embodiment the transformed image is cropped such that a user can observe a conventional rectangular image, or any other desired geometrical shape, representing a subsection of the transformed image. In a further embodiment, the size, and thus the effective field of view of the transformed image may be increased or decreased by zooming into or out of the image using conventional techniques.

In still another embodiment, the light ray, and thus the corresponding pixel, may be further transformed by determining the Doppler shift of the light ray by using a Doppler shift factor. The Doppler shift factor is related to the relative velocity between the observer and the camera. Next, the observed wavelength of the light ray, $\lambda'$, is computed using the Doppler shift factor in combination with the wavelength of the light ray, $\lambda$, from the original, untransformed, image. The wavelength $\lambda$ of the light ray is determined by conventional methods based on the color and intensity of the corresponding pixel in the original image.

In transforming a panorama, i.e. a cylindrical or spherical view of a scene obtained using conventional methods, two cases are considered. First, where the input image is a panorama, and it is desired to form a non-panoramic view of a portion of the original, untransformed, panorama from the view of an observer in the new inertial reference frame, the direction of each incoming light ray of the panorama is calculated as described above for the case of a single image. Again, as described above, the unit 3D vector of the direction of an incoming light ray corresponding to each individual pixel in the observer's view is used to determine the corresponding pixels on the original, untransformed panorama. As discussed above, this transformed image may also be cropped so as to display a subsection of the transformed image in any desired shape. Further, this image may also be Doppler shifted as described above.

Second, where the input image is a panorama, and it is desired to transform the entire panorama to form a panoramic view in the new reference frame of the observer, the global ground coordinate system and the global observer coordinate system are assumed to coincide. Thus, all the pixels in the panorama are transformed. After the new panorama is generated, a user can interactively view the panorama using a conventional panorama player. Again, in either case, the Doppler shift of each of the light rays defining the transformed image or panorama may be determined as described above for the case of a single image.

In transforming a motion video or film produced from either a series of cameras, or from a moving camera, a determination is first made as to whether the motion video or film represents constant speed motion along a straight line, whether it represents constant speed motion along a curve, or whether it represents accelerated motion along either a straight line or a curve.

In general, in the first case where the motion video or film represents constant speed motion along a straight line, the video or film may be captured using either a moving camera, or a series of stationary cameras at specific points in space. Consequently, if a group of video or film cameras is arranged along a straight line, and capture a scene simultaneously, image frames selected from these cameras are processed using the IBRR system described above for single images to form a video or film sequence that a high-speed moving virtual observer would see. It should be noted that in this case, the frame rate of the observer is constant. Further, if the scene is static during the moment of capturing, i.e. all the frames in each stationary video camera are identical, only a single moving video or film camera may be used instead of a group of stationary video cameras. It should be noted that the speed of light is so high, that as the relative velocity between inertial reference frames increases, virtually every motion, and thus every scene captured in the initial inertial reference frame, is effectively static from the point of view of an observer moving at a speed approaching relativistic velocities.

For example, assuming use of a group of motion video or film cameras, the cameras are uniformly positioned along a straight line to capture a scene simultaneously. The separation distance between the cameras is determined by the desired frame rate of the video or film along with the camera velocity which is being simulated by use of a sequence of cameras. Further, it should be noted that this simulated camera velocity is not the relativistic velocity of the virtual observer which is obtained by transformation of the sequence of images represented by the motion video or film.

Similarly, assuming a single video or film camera is moving along the same straight line, the speed of the moving camera is set in such a way that the moving camera captures each frame at each position of the stationary cameras in turn. To achieve this, the required velocity of the moving camera is determined based on the desired frame rate and the effective distance between captured image frames. In this manner, a sequence of pictures captured by the moving camera is identical to a sequence of images consisting of a set of pictures extracted from a group of stationary cameras.

Thus, where a virtual observer moving along the same straight line with a desired velocity reaches the position where an image frame is captured at the moment that the stationary camera is capturing a frame of a video sequence, then the observer will view the same image frame. This remains true for each frame because each subsequent image frame is processed as if it were the first image frame. The space and time coordinates of the virtual observer, measured in S' are then calculated in accordance with the Lorentz Transformation as described above.

However, because the virtual observer is moving with a velocity relative to the camera, the moving virtual observer will see the images relatively earlier than the image frame captured by an ordinary moving camera. When moving at relativistic velocities, the time dilation effect described by the Special Theory of Relativity must be considered. The result is that an effective frame rate of viewing by the virtual observer may be calculated. However, because the frame rate of the virtual observer traveling at relativistic velocities would be extremely fast, the human eye could not view an image sequence displayed at such a frame rate. Therefore, this frame rate is preferably slowed to a much slower frame rate that the human eye is capable of observing, such as is used for conventional viewing of motion video or film. Consequently, the relativistically transformed image sequence is effectively viewed in slow motion.

In the second case, where the motion video or film represents constant speed motion along a curve, the motion of the virtual observer moving along the curve at a constant speed can be approximated by a group of constant speed motions along straight-line intervals. Again, the motion video or film may be captured using a group of stationary cameras along a curved path, or a single camera moving along the curved path with normal constant speed (if the scene is static during the moment of capturing, as described above). The frame rate of the virtual observer will still be constant since it only depends on the magnitude of the speed. The orientation of the video camera and the tangent direction of the curve at each image capture position is used in the processing of each image frame using the IBRR system described above for the case of a single image.

In the third case, although the treatment of accelerated motion along either a straight line or a curve properly belongs to General Relativity, such motion may still be roughly dealt with using Special Relativity as described above. Specifically, an accelerated motion of a virtual observer can be approximated by a group of motions along straight-line intervals. Consequently, a low-speed moving video or film camera having an acceleration proportional to that of a moving virtual observer can be used to capture the scene if the scene is static during the moment of capturing. Note in this case that the frame rate of the observer no longer keeps constant. However, the frame rate during video or film playback of the transformed images can simply be adjusted to compensate for this effect.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Introduction

Traditional ray tracing methods for rendering images are based on a determination of very complex light interactions, with the ultimate goal of finding the color, shade, or intensity of each point in a view window. In general, ray tracing is based on the idea that reflection and refraction of light rays can be modeled by recursively following the path that light takes as it bounces through an environment. Traditionally, this path is determined from a point within the view window towards an object and then a light source that illuminates the object within the scene. Consequently, using basic principles of reflection and refraction, the color, shade, or intensity of pixels in a final image can be determined by tracing a plurality of light rays as they are reflected and refracted while traveling through a scene comprised of three dimensional models or objects. In other words, ray tracing is used to simulate the path that light rays take as they bounce around within the world, i.e. they are traced through a scene comprised of three-dimensional objects or models. The three-dimensional objects or models are either non-transparent, thus requiring a consideration of reflection of light rays, or partially or fully transparent, thus requiring a consideration of refraction of light rays.

When using traditional ray tracing techniques, if an object is reflective, a new reflected light ray is simply traced from the point of intersection with the object towards the direction of reflection. The reflected ray is the mirror image of the original ray, pointing away from the surface, with the angle of reflection equivalent to the angle of incidence. Further, if the object is to some extent transparent, then a refracted ray is traced into the surface of the object, with the light ray continuing through at least a portion of the object. If the materials on either side of the surface of the object have different indices of refraction, such as air on one side and water on the other, then the refracted ray will be bent to some degree. Expanding on these general principles, it is clear that the process of ray tracing becomes increasingly complex as multiple light sources are considered, and as multiple objects or models, having various degrees of transparency are used to populate a scene to be rendered using ray tracing. Consequently, ray tracing techniques tend to be computationally expensive.

In contrast, the relativistic rendering techniques of the present invention are not concerned with either the reflection or refraction of light rays, and further, as mentioned above, the techniques of the present invention do not require the use of artificial models or objects. In fact, unlike traditional ray tracing methods, the relativistic rendering techniques of the present invention are capable of transforming any existing image of a scene to accurately simulate how the scene would be viewed by an observer that is traveling at any desired velocity up to the speed of light.

Exemplary Operating Environment

Figure 1:
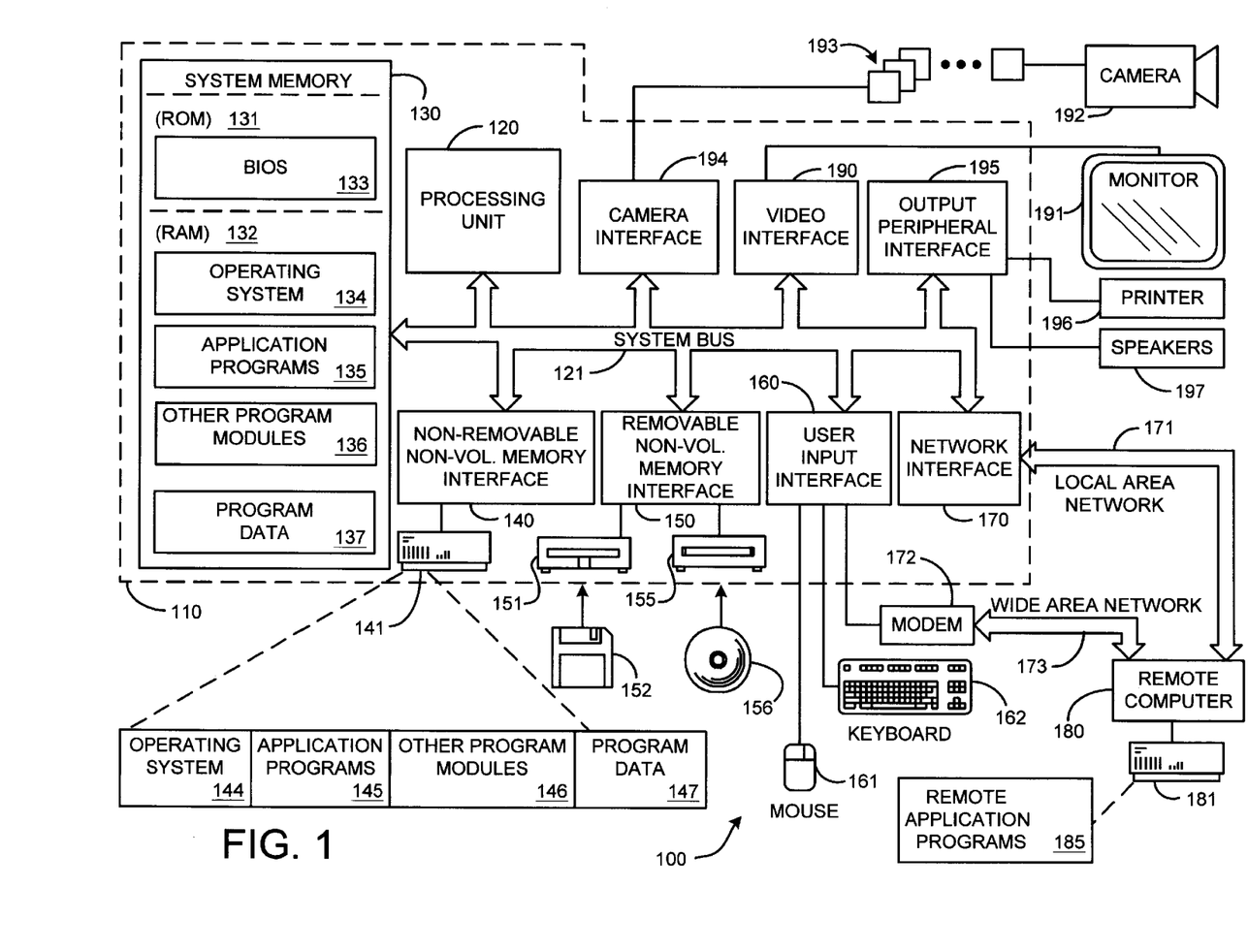
FIG. 1 is a diagram depicting a general-purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also; connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and process embodying the present invention. The program modules associated with relativistic transformation of images will be described first in reference to the system diagram of FIG. 2. In addition, the processes for relativistic transformation of images will be described with reference to the flow diagram of FIG. 4.

System Overview

Figure 2:
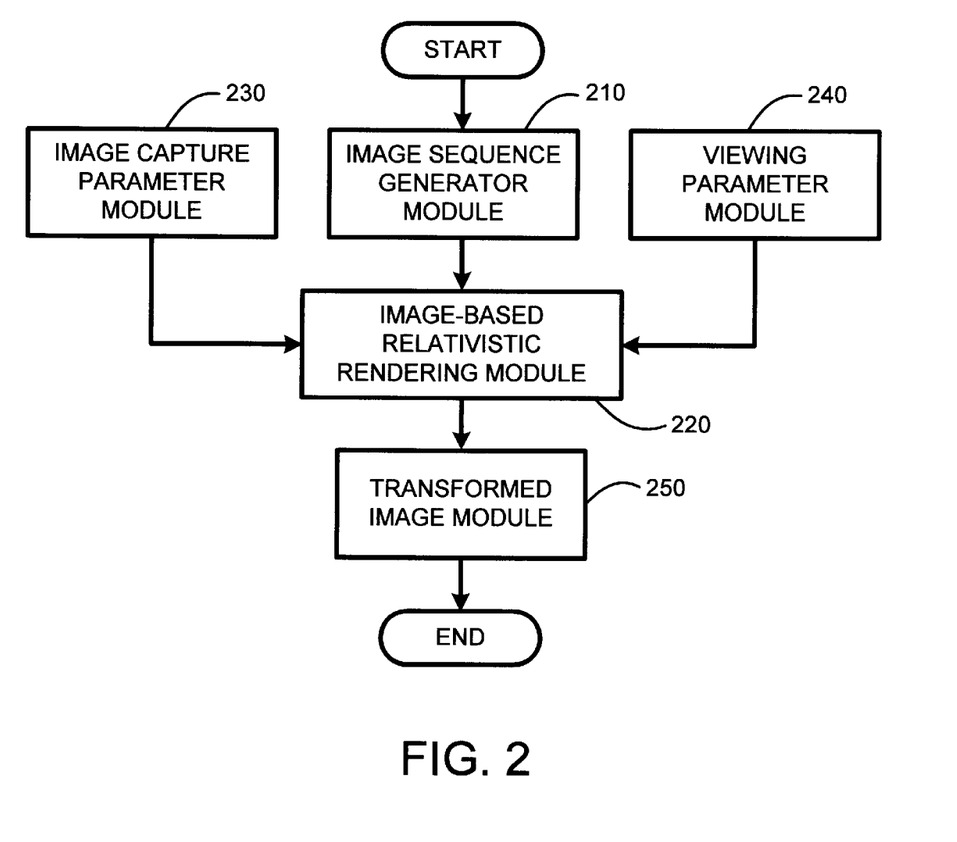
FIG. 2 is a system diagram depicting program modules employed in a system for relativistic transformation of images in accordance with the present invention.

FIG. 2 is a general system diagram illustrating program modules used for image-based relativistic rendering (IBRR) in accordance with the present system and process. In general, a system and process according to the present invention uses the program modules illustrated in FIG. 2 to automatically transform images such that each image accurately simulates how the scene depicted by the image would look to an observer traveling at any desired velocity up to the speed of light.

Specifically, as illustrated in FIG. 2, the process is started by using an image sequence generator module 210 to provide one or more sequential images of a scene to an image-based relativistic rendering (IBRR) module 220. These sequential images may be produced by any conventional method, and include, for example, photographs, panoramas, motion video or film, or any other type of image captured by a camera or other image capture device. The image sequence generator module 210 preferably provides these sequential images as a live input via a conventional image capture device connected to a computing device for implementing the present invention. However, the image sequence generator module 210 may also provide sequential images that have been previously recorded and stored on computer readable media using conventional methods. These stored sequential images may then be processed at any convenient time in the same manner as for live images as described below.

Next, an image capture parameter module 230 provides information about each captured image to the IBRR module 220. This image capture parameter information includes data such as, for example, the angular shift of the camera used to capture the images, the field of view of the camera, and the aspect ratio of the images. In addition, desired viewing parameters are provided to the IBRR module 220 via a viewing parameter module 240. These viewing parameters include data such as, for example, the desired observational speed and direction (i.e. the velocity and direction of an observer relative to the initial image), the desired angle and rotation of view, the desired field of view, and the desired viewing aspect.

Once the IBRR module 220 has received an image, it's capture parameters, and the desired viewing parameters, the IBRR module processes the image and returns a relativistically transformed image to a transformed image module 250. The transformed image module then displays the transformed image on a conventional display device, and/or stores the transformed image on computer readable storage media. Further, because the image sequence generator module 210 provides images on an ongoing basis, for as long as relativistic rendering is desired, the program modules described herein continue to generate rendered images, as described below, for as long as additional images are provided as inputs.

Relativity

Albert Einstein established the Special Theory of Relativity in 1905 upon the following two postulates: First, the laws of physics must be the same for observers in all inertial reference systems; Second, the speed of light (c) is constant in a vacuum in all inertial frames and is independent of the motion of a light source relative to the observer. Accordingly, some rules are deduced from these two postulates: 1) The measured space and time coordinates are dependent upon the reference frame from which the measurement is conducted; and 2) Lorentz Transformation equations relate measured space-time coordinates between inertial reference frames, and therefore, a) Lengths perpendicular to relative motion remain the same measurements regardless of the inertial observer, b) Lengths parallel to relative motion are measured to have undergone contraction in comparison with their rest lengths, and c) Clocks in inertial frames have varying rates dependent upon their motions.

Further, Einstein's Special Theory of Relativity shows that as the velocity of an object approaches the speed of light the mass of that object increases dramatically. Consequently, accelerating an object to velocities approaching the speed of light requires an ever-increasing amount of energy. Thus, it is not realistically feasible to accelerate an object, such as a camera or an observer, to even a relatively small fraction of the speed of light. However, a photon can travel at the speed of light because its static mass equals zero. Consequently, the theory of relativity requires that space, time and the wavelength of light must be bound together in a consideration of relativistic events. A 7-dimensional (7D) plenoptic function is useful for considering such relativistic events.

Figure 3A:
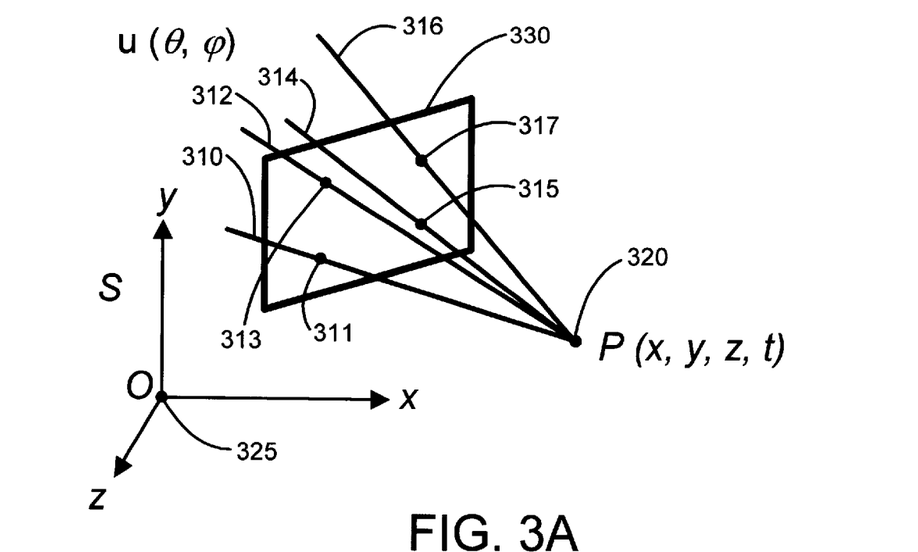
FIG. 3A is a diagram depicting the use of light rays to represent image pixels of an image in an initial inertial reference frame in accordance with the present invention.
Figure 3B:
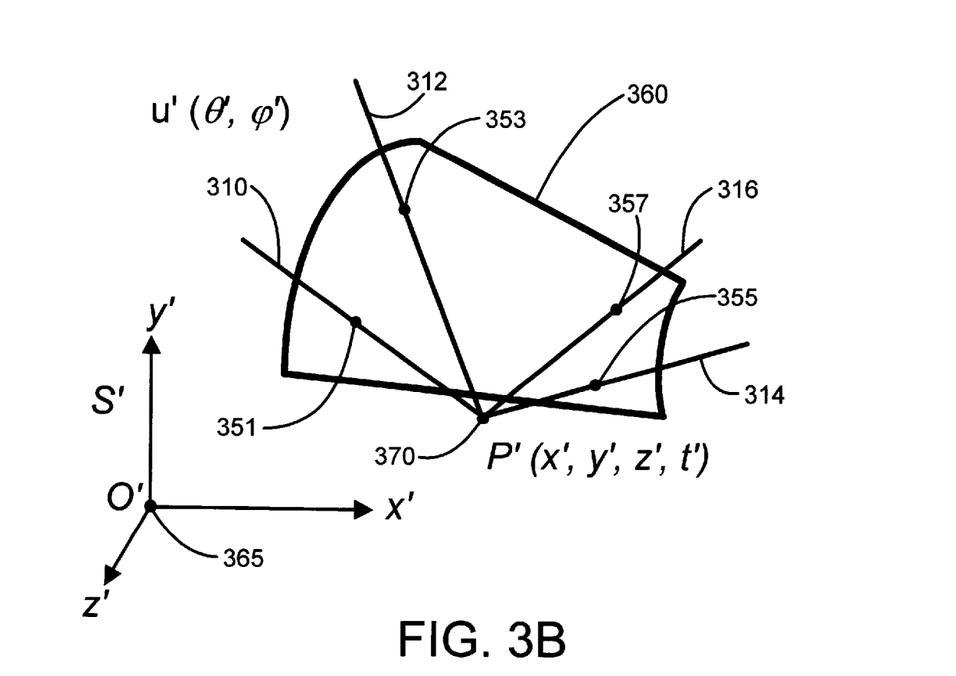
FIG. 3B is a diagram depicting the use of transformed light rays to represent the image pixels of FIG. 3A.

As illustrated in FIG. 3A and FIG. 3B, an image or a picture is actually a partial sampling of a 7D plenoptic function l(x, y, z, θ, φ, λ, t) that records light rays 310, 312, 314, and 316, having a given wavelength (λ) reaching the lens optical center (P) 320 of a camera at position (x, y, z) at time t along a certain directions (θ, φ) from a point of origin (O) 325 representing the image or picture 330 being recorded. In accordance with Einstein's Special Theory of Relativity, any given single space-time points 311, 313, 315, and 317 in a given reference frame (S, as illustrated in FIG. 3A), when transformed, will map to single space-time points 351, 353, 355, and 357, respectively, in a new reference frame (S', as illustrated in FIG. 3B). Consequently, a partial sampling of a 7D plenoptic function at the optical center of a camera lens is still a partial sampling of a 7D plenoptic function in any other reference frame. The only differences are that the directions of the light rays, 310, 312, 314, and 316 may have another distribution (θ', φ'), and the colors that correspond to certain intensity distributions of spectra may also be changed (i.e. Doppler Shift). Thus, by transforming the light rays 310, 312, 314, and 316 from the S inertial reference frame to the S' inertial reference frame, a relativistically transformed view 360 of the image 330 is achieved.

As further illustrated by FIG. 3A and FIG. 3B, the initial inertial reference frame of a camera used for image acquisition is denoted by S, and the inertial reference frame of an observer is denoted by S', where S' is moving relative to S with velocity $v=(v_x, v_y, v_z)$. For convenience, the coordinate systems in S and S' are preferably chosen so that their axes are parallel, and their origins O and O', 325 and 365 respectively, coincide with each other at time t=t'=0. However, non-parallel axes may also be used. In the event that non-parallel axes are used, conventional calculations are applied to convert the direction, orientation and origin of light rays in the S reference frame to their corresponding direction, orientation and origin relative to the S' reference frame. Assuming parallel axes and coincident origins, 325 and 365, in the S and S' reference frames, an event, such as light rays 310, 312, 314, and 316 comprising an image 360, occurring at position P' 370 at time t' measured in S' is described by a space-time coordinate P'=(P', t')=(x', y', z', t'). The corresponding space-time coordinate P 320 of the event measured in S is related to (P', t') via the Lorentz Transformation as shown in Equations 1 and 2:

$$P = P' + \left[\frac{(\gamma - 1)}{v^2}(P' \cdot v) + \gamma t'\right] v, \quad t = \gamma\left(t' + \frac{P' \cdot v}{c^2}\right) \quad (1)$$

where $$\gamma = 1 \bigg/ \sqrt{1 - \frac{v^2}{c^2}}, \quad v = \|v\| = \sqrt{v_x^2 + v_y^2 + v_z^2} \quad (2)$$

Thus, where the velocity of an object measured in the inertial reference frame S' is $u'(u_x', u_y', u_z')$, the velocity $u(u_x, u_y, u_z)$ of the same object measured in the S inertial reference frame is related to $u'(u_x', u_y', u_z')$ via Lorentz velocity transformation as shown in Equation 3:

$$u = \left[u' + \left(\frac{\gamma - 1}{v^2} v \cdot u' + \gamma\right) v\right] \bigg/ \left[\gamma\left(1 + \frac{v \cdot u'}{c^2}\right)\right] \quad (3)$$

Further, the Relativistic Doppler Effect may also be computed for light rays transformed via the Lorentz transform. The Doppler effect is used to determine an observed frequency shift between the S and S' inertial reference frames where there is relative motion between an image captured in one inertial reference frame where the light source is at rest relative to the frame, and an observer in the other reference frame. In addition, the wavelength of the light ray representing a pixel in the original, untransformed, image is determined by conventional methods based on the color and intensity of that pixel in the original image. For example, λ' is the wavelength of a light source, or light ray, measured in a reference frame S' in which the light source is at rest. Thus, if the unit vector of the direction of the light source observed in S is r, then the wavelength λ of the light source measured in the reference frame S is determined by Equation 4 as follows:

$$\lambda = \alpha \lambda' \quad (4)$$

where the Doppler shift factor, α, is given by Equation 5 as follows:

$$\alpha = \gamma\left(1 + \frac{r \cdot v}{c}\right) \quad (5)$$

In addition, transformation from the S' to the S inertial reference frame is symmetrical to transformation from the S to the S' inertial reference frame. Consequently, if the parameters in the inertial reference frame S are known, the parameters in the inertial reference frame S' are determined using the equations described above, except that that v is simply replaced by −v.

Image Based Relativistic Rendering

As discussed above, an image or picture of a scene actually records a group of light rays going through the optical center 320 of the lens of the camera in a particular instant. For the purposes of this invention, each image pixel (i.e. 311, 313, 315, and 317, as illustrated in FIG. 3A) is considered to be represented by a single corresponding light ray (i.e. 310, 312, 314, and 316, respectively). Thus, recording an image in any given initial inertial reference frame produces a set of rays relative to that initial reference frame. Each of these rays is then processed using the Lorentz transformation to synthesize a novel view from a new inertial reference frame.

This new inertial reference frame may have any desired observational parameters. These observational parameters include, for example, the observational speed and direction (i.e. the speed and direction of the new reference frame relative to the initial reference frame), as well as other conventional viewing parameters such as the angle and rotation of view, the field of view and the viewing aspect. Further, while the viewing parameters are unique to each reference frame, the origin from which the scene is viewed in each inertial reference frame is identical. In other words, the space-time point of the optical center 320 of the camera lens in the initial inertial reference frame coincides with the point 370 from which the scene is viewed in the new reference frame. In addition, while these points coincide, the viewing parameters of the observer in the new reference frame do not necessarily coincide with the viewing parameters of the camera that captured the image, as discussed above. Consequently, choosing the light rays 310, 312, 314, and 316 within the view port (360 of FIG. 3B) of an observer in the new reference frame results in a novel view of the scene which has undergone relativistic transformations. As a result, photo-realistic synthesis of relativistic effects such as view deformation and Doppler shift of an image captured at conventional speeds using conventional methods is achieved by the present invention.

Specifically, referring back to FIG. 2, one or more images captured in an initial inertial reference frame S, along with the parameters defining how each image was captured, are provided to the IBRR module 220. Parameters defining how each image was captured include information such as angular shift of the camera, field of view of the camera, and the aspect of the camera image relative to the origin of the S reference frame. In addition, viewing parameters chosen by a user are also provided to the IBRR module via a user interface in the viewing parameter module 240. Further, this input may also be provided in other conventional ways, such as, for example, use of a look-up table to provide parameters, random generation of parameters, computer generated parameters based on predetermined criteria, etc. These viewing parameters represent a virtual observer in a new inertial reference frame S', and, as discussed above, include information such as relative velocity between the S and S' reference frames, the direction of the relative velocity, the angular shift of the virtual observer, the field of view of the virtual observer, and the aspect of the image as viewed by the virtual observer relative to a common origin between the S and S' reference frames. The IBRR module 220 then transforms each image, as discussed below, so that it appears as it would if the virtual observer in the S' reference frame had actually acquired the image while viewing the scene at any desired viewing angle, orientation and velocity.

For convenience, the coordinate systems in S and S' are preferably chosen so that their xyz- and x'y'z'-axes, respectively, are parallel, and their origins O and O', respectively, coincide with each other when the image is acquired by the camera at time t=t'=0. However, non-parallel axes may also be used. In the event that non-parallel axes are used, conventional calculations are applied to convert the direction, orientation and origin of light rays in the S reference frame to their corresponding direction, orientation and origin relative to the S' reference frame.

Transformation of a Single Image

In transforming an image using the IBRR module (220 of FIG. 2), four coordinate systems are considered, two for each inertial reference frame. First, a global ground coordinate system relative to the scene being captured defines the initial inertial reference frame, i.e. the S reference frame. Second, a local camera coordinate system that defines the orientation of the camera relative to the global ground coordinate system of the S reference frame. Third, a global observer coordinate system defines the new reference frame, i.e. the S' reference frame. Fourth, a local observer coordinate system defines the orientation of the virtual observer within the global observer coordinate system of the S' reference frame.

Initially, to simplify subsequent calculations, the directions of both the camera and the virtual observer are oriented along the negative z-axis of the global ground coordinate system and the negative z'-axis of the global observer coordinate system, respectively, so that the local coordinate systems of the camera and the observer coincide with the global ground coordinate system and the global observer coordinate system, respectively. However, alignment along any axis may be used; the negative z-axis is simply chosen for convenience. A new orientation, i.e. the local coordinate system, of the camera or the virtual observer is then specified by a group of angular shifts about the xyz- and x'y'z'- axes, respectively. Further, any other order of rotation such as, for example, rotation about the x-axis, y-axis, then z-axis, or rotation about the z-axis, y-axis, then x-axis, etc. may also be used so long as the corresponding rotation matrices described below are properly constructed. Thus, for instance where $\Delta\theta_c$ represents rotation about the x-axis, $\Delta\phi_c$ represents rotation about the y-axis, and $\Delta\omega_c$ represents rotation about the z-axis, the notation $(\Delta\phi_c, \Delta\theta_c, \Delta\omega_c)$ means that the camera reaches its new orientation by first rotating around its local y-axis by an angle $\Delta\phi_c$ and then rotating around its local x-axis by an angle $\Delta\theta_c$, and finally rotating around its local z-axis by an angle $\Delta\omega_c$. The rotation matrices described below use this rotation order (i.e. y, x, then z axis rotation).

A unique unit 3D vector of the direction of an incoming light ray corresponding to each individual pixel in an observer's view is denoted by $\hat{d}'_0$. The unit 3D vector, $\hat{d}'_0$, is determined using the row and column numbers of the pixel, the field of view, the width and height of the image in the observer's view, and the point from which the scene is viewed. In the global coordinate system of the observer, the direction of the light ray is given by Equation (6) as follows:

$$\hat{d}' = M_1^{-1}(\Delta\phi'_0) M_2^{-1}(\Delta\theta'_0) M_3^{-1}(\Delta\omega'_0) \hat{d}'_0 \tag{6}$$

where $M_1$, $M_2$ and $M_3$ are the rotation matrixes shown in Equations 7a, 7b, and 7c, with the inverse matrixes of $M_1$, $M_2$ and $M_3$ being equal to their respective transposes:

$$M_1(\Delta\varphi) = \begin{pmatrix} \cos\Delta\varphi & 0 & -\sin\Delta\varphi \\ 0 & 1 & 0 \\ \sin\Delta\varphi & 0 & \cos\Delta\varphi \end{pmatrix} \tag{7a}$$

$$M_2(\Delta\theta) = \begin{pmatrix} 1 & 0 & 0 \\ 0 & \cos\Delta\theta & \sin\Delta\theta \\ 0 & -\sin\Delta\theta & \cos\Delta\theta \end{pmatrix} \tag{7b}$$

$$M_3(\Delta\omega) = \begin{pmatrix} \cos\Delta\omega & \sin\Delta\omega & 0 \\ -\sin\Delta\omega & \cos\Delta\omega & 0 \\ 0 & 0 & 1 \end{pmatrix} \tag{7c}$$

Deduced from the Lorentz velocity transformation (Equation 3), the unit vector of the direction of the light ray measured in the global reference frame of the ground is $$\hat{d} = \frac{\hat{d}' + (\gamma - 1)(\hat{\beta} \cdot \hat{d}')\hat{\beta} + \gamma\beta}{\gamma(1 + \beta \cdot \hat{d}')} \tag{8}$$

where the relative velocity, $\beta$, and the unit direction of the relative velocity $\hat{\beta}$ are given by Equation 9 as follows:

$$\beta = \frac{v}{c}, \quad \hat{\beta} = \frac{v}{v_c} \tag{9}$$

with v representing the magnitude and direction of the viewing velocity chosen by the user, and $v_c$ representing the magnitude and direction of the light source.

Consequently, when viewed from the local coordinate system of the camera, the direction of the incoming light ray is given by Equation 10 as follows:

$$\hat{d}_c = M_3(\Delta\omega_c) M_2(\Delta\theta_c) M_1(\Delta\phi_c) \hat{d} \tag{10}$$

This direction is then used to determine the corresponding pixel in the original, untransformed, image by mapping the position of each of the pixels in the original image to the location in the S' reference frame where each of the light rays representing those pixels intersects the view port (360 of FIG. 3B) or viewing plane of the observer in the new reference frame. The end result is relativistically transformed pixel-based image having the same resolution and quality as the original input image. However, when images are transformed to show relativistic velocities, an original rectangular image (330 of FIG. 3A) will map to an image having curved edges (360 of FIG. 3B). Further, as the relativistic velocity increases, the deformation of the shape of the original image naturally increases.

Thus, in one embodiment the transformed image is cropped such a user can observe a conventional rectangular image, or any other desired geometrical shape, representing a subsection of the transformed image. In a further embodiment, the size, and thus the effective field of view of the transformed image may be may be increased or decreased by zooming into or out of the image using conventional techniques.

In still another embodiment, the light ray, and thus the corresponding pixel, may be further transformed by determining the Doppler shift of the light ray. The Doppler shift factor is related to the relative velocity between the observer and the camera, and is given by Equation 11 as follows:

$$\alpha = \gamma(1 + \hat{d} \cdot \beta) \quad (11)$$

The observed wavelength of the light ray, $\lambda'$, is then computed using the Doppler shift factor in combination with the wavelength of the light ray, $\lambda$, from the original, untransformed, image as shown above in Equation 4. Note using $-v$ in the equation since $\lambda'$ is deduced from $\lambda$ in this case.

Transformation of a Panorama

In transforming a panorama, i.e. a cylindrical or spherical view of a scene obtained using conventional methods, two cases are considered.

First, where the input image is a panorama, and it is desired to form a non-panoramic view of a portion of the original, untransformed, panorama from the view of an observer in the new inertial reference frame, the direction of each incoming light ray of the panorama is calculated in accordance with Equations (6) and (8) as described above for the case of a single image. Again, $\hat{d}$ is used to determine the corresponding pixels on the original, untransformed panorama. As discussed above, this transformed image may also be cropped so as to display a subsection of the transformed image in any desired shape.

Second, where the input image is a panorama, and it is desired to transform the entire panorama to form a panoramic view in the new reference frame of the observer, it is only necessary to use Equation (8). The reason that Equation (6) is not necessary in this case is that where a view of the entire panorama is desired, the global ground coordinate system and the global observer coordinate system are assumed to coincide. After the new panorama is generated, a user can interactively view it using a conventional panorama player.

In either case, the Doppler shift of each of the light rays defining the transformed image or panorama may be determined as described above for the case of a single image.

Transformation of Sequential Images

In transforming sequential images, such as a motion video or film produced from either a series of cameras, or from a moving camera, a determination is first made as to whether the motion video or film represents constant speed motion along a straight line, whether it represents constant speed motion along a curve, or whether it represents accelerated motion along either a straight line or a curve.

In general, in the first case where the motion video or film represents constant speed motion along a straight line, the video or film may be captured using either a moving camera, or a series of stationary cameras at specific points in space. Consequently, if a group of video or film cameras is arranged along a straight line, and capture a scene simultaneously, image frames selected from these cameras are processed using the IBRR system described above for single images to form a video or film sequence that a high-speed moving virtual observer would see. Note the frame rate of the observer is also constant. In particular, if the scene is static during the moment of capturing, i.e. all the frames in each stationary video camera are identical, only a single moving video or film camera may be used instead of a group of stationary video cameras. It should be noted that the speed of light is so high, that as the relative velocity between inertial reference frames increases, virtually every motion, and thus every scene captured in the initial inertial reference frame, is effectively static from the point of view of an observer moving at a speed approaching relativistic velocities.

For example, assuming that a group of video cameras are uniformly positioned along a straight line to capture a scene simultaneously, the position of the ith video camera is denoted as $P_i$ such that:

$$P_i = P_0 + iL \quad (12)$$

where $P_0$ is the starting point, i.e. the position of the first camera, and L is the vector of an interval along the straight line. The separation L between the cameras is determined by the desired frame rate of the video or film along with the camera velocity which is being simulated by use of a sequence of cameras. Further, it should be noted that this simulated camera velocity is not the relativistic velocity of the virtual observer which is obtained by transformation of the sequence of images represented by the motion video or film. If each camera captures m image frames per second, the jth image frame for each camera is captured at time $t_j$ such that:

$$t_j = t_0 + \frac{j}{m} \quad (13)$$

where $t_0$ is the capturing time of image frame 0. Similarly, assuming a single video or film camera is moving along the same straight line, the speed of the moving camera is set in such a way that the moving camera captures each frame at each position of the stationary cameras in turn, i.e. it captures ith frame at position $P_i$. To achieve this, the required velocity of the moving camera, $v_c$, is determined by Equation (14) as follows:

$$v_c = \frac{L}{1/m} = mL \quad (14)$$

Consequently, the sequence of pictures captured by the moving video camera are identical to the sequence consisting of pictures extracted at ith frame from ith stationary video camera.

Thus, if a virtual observer moving along the same straight line with velocity v reaches the position $P_i$ at the moment that the ith stationary video camera is capturing its jth frame of a video sequence, then the observer will view the same image frame. Further, because the virtual observer is moving along the same straight line, $v_c$ is parallel to v. The space and time coordinates of the virtual observer, measured in S' may be defined by Equation (15) as follows:

$$P'_i = P_i + \left[\frac{(\gamma-1)}{v^2}(P_i \cdot v) - \gamma t_j\right]v, \quad t'_j = \gamma\left(t_j - \frac{P_i \cdot v}{c^2}\right) \qquad (15)$$

Consequently, in accordance with the Lorentz Transformation of Equation (1), substituting Equations (12) and (13) into Equation (15), the space and time coordinates of the virtual observer may be computed by Equation (16) as follows:

$$P'_i = P'_0 + \left(\frac{iL \cdot v}{v^2} - \frac{j}{m}\right)v, \quad t'_j = t'_0 + \gamma\left(\frac{j}{m} - \frac{iL \cdot v}{c^2}\right) \qquad (16)$$

Since the virtual observer is at rest in his inertial reference frame with respect to each observed image frame:

$$P'_i = P'_0 \text{ for any } i \qquad (17)$$

therefore, $$j = \frac{iL \cdot v}{v^2}m \qquad (18)$$

Substituting Equation (14) into Equation (18) and recalling that $v_c$ is parallel to v as previously discussed, it is seen that:

$$j = \frac{v_c}{v}i \qquad (19)$$

Consequently, the moving virtual observer will see the jth image frame $v/v_c$ times earlier than the ith image frame captured by an ordinary moving camera. Therefore, substituting Equation (19) into Equation (16), it is seen that:

$$t'_j = t'_0 + \frac{i}{\frac{v\gamma m}{v_c}} \qquad (20)$$

where γ represents the time dilation effect described by the Special Theory of Relativity.

Correspondingly, the frame rate, m', of the virtual observer may be calculated by Equation (21) as follows:

$$m' = \frac{v\gamma m}{v_c} \qquad (21)$$

Thus, it is seen that the frame rate of the virtual observer should be $(v/v_c)$ times faster than that of an ordinary moving camera. Again, the additional γ factor in Equation (21) represents the aforementioned time dilation effect. Consequently, at relativistic velocities, the duration of an event between two frames viewed from the reference frame of ground is γ times slower than that viewed from a high-speed moving observer. However, it should be noted that the $\gamma_c$ classically associated with $v_c$ is ignored because it is approximately equal to 1. Further, because the frame rate of the virtual observer traveling at relativistic velocities would be extremely fast, the human eye could not view an image sequence displayed at such a frame rate. Therefore, this frame rate is preferably slowed to a much slower frame rate that the human eye is capable of observing, such as is used for conventional viewing of motion video or film. Consequently, the relativistically transformed image sequence is effectively viewed in slow motion.

In the second case, where the motion video or film represents constant speed motion along a curve, the motion of the virtual observer moving along a curve at a constant speed can be approximated by a group of constant speed motions along straight-line intervals. Again, the motion video or film may be captured using a group of stationary cameras along a curved path, or a single camera moving along the curved path with normal constant speed (if the scene is static during the moment of capturing). The frame rate of the virtual observer will still be constant since it only depends on the magnitude of the speed (See Equation (21)). The orientation of the video camera and the tangent direction of the curve at each image capture position are used to determine the parameters defining how each image frame was captured, i.e. the angular shift, field of view, and aspect of the camera. These parameters are then used for individually processing each image frame using the IBRR system described above for the case of a single image.

In the third case, although the treatment of accelerated motion and motion along a curve properly belongs to General Relativity, such motion may still be roughly dealt with using Special Relativity as described above. Specifically, an accelerated motion of a virtual observer can be approximated by a group of motions along straight-line intervals. Consequently, a low-speed moving video or film camera having an acceleration proportional to that of a high-speed moving virtual observer can be used to capture the scene if the scene is static during the moment of capturing. Note in this case that the frame rate of the observer no longer keeps constant (See Equation (21)), however, the frame rate during video or film playback of the transformed images can simply be adjusted to compensate for this effect.

Operation

The above-described program modules are employed to relativistically transform at least one image using the exemplary process that will now be described. This process is depicted in the flow diagram of FIG. 4 as a series of actions that illustrates an exemplary method for implementing the present invention.

Figure 4:
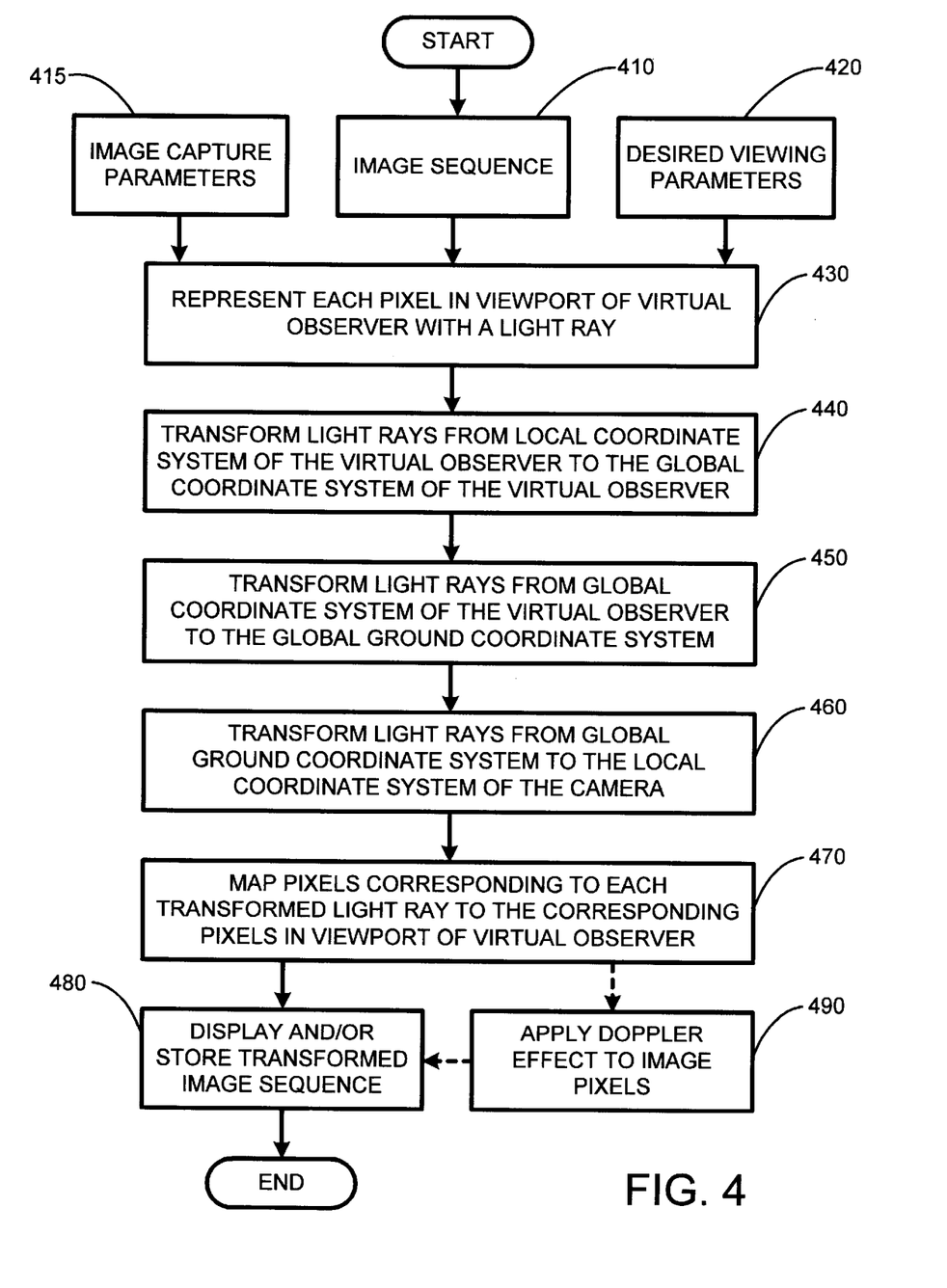
FIG. 4 is a flow diagram illustrating an exemplary process for relativistic transformation of images according to the present invention.

The process is started by providing a sequence of at least one pixel-based image (Box 410) along with the image capture parameters (Box 415) and the desired viewing parameters (Box 420) to the IBRR module 240. The IBRR module 240 then represents each image pixel within the view port of the virtual observer with a light ray (Box 430).

Next, using the aforementioned transformation equations, the light rays are transformed from the local coordinate system of the virtual observer to the global coordinate system of the virtual observer (Box 440). This transformation is accomplished in accordance with the desired angular shift of the virtual observer ($\Delta\phi'_0$, $\Delta\theta'_0$, $\Delta\omega'_0$) about the y'x'z'-axes, the field of view chosen by the user, and the viewing aspect of the virtual observer as described above.

Next, again using the aforementioned transformation equations, the light rays are further transformed from the global coordinate system of the virtual observer to the global ground coordinate system (Box 450). This transformation is accomplished based on the desired relative speed ratio β, and the desired relative velocity direction ($\theta'_v$, $\phi'_v$), as described above.

Next, again using the aforementioned transformation equations, the light rays are further transformed from the global ground coordinate system to the local coordinate system of the camera (Box 460). This transformation is accomplished based on the recorded angular shift of the camera ($\Delta\phi_c$, $\Delta\theta_c$, $\Delta\omega_c$) about the yxz-axes, the recorded field of view of the camera, and the recorded viewing aspect of the camera, as described above.

Once these transformations have been completed, the image pixels in the original image corresponding to the transformed light rays are simply mapped back the appropriate position in the inertial reference frame of the virtual observer (Box 470). This mapping procedure is accomplished, as described above, by mapping each image pixel from the original, untransformed, image to the position within the view port of the virtual observer where the light rays corresponding to each of the pixels intersect the view port of the virtual observer in the inertial reference frame of the virtual observer.

Finally, the transformed image is displayed using conventional methods on a conventional display device (Box 480). The transformed image may also be stored on computer readable media for display at a later time. This display and/or image storage process is continued for as long as it is desired to transform additional images.

Further, in an alternate embodiment, the image pixels in the transformed image are Doppler shifted, as described above, prior to display or storage (Box 490).

EXAMPLES

Figure 5A:
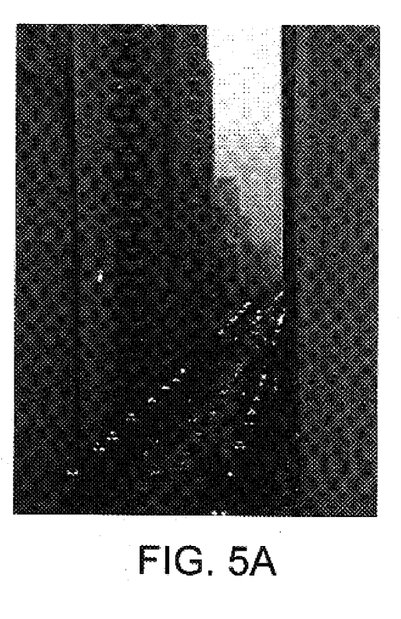
FIG. 5A is a photograph showing an image prior to relativistic transformation in accordance with the present invention.
Figure 5B:
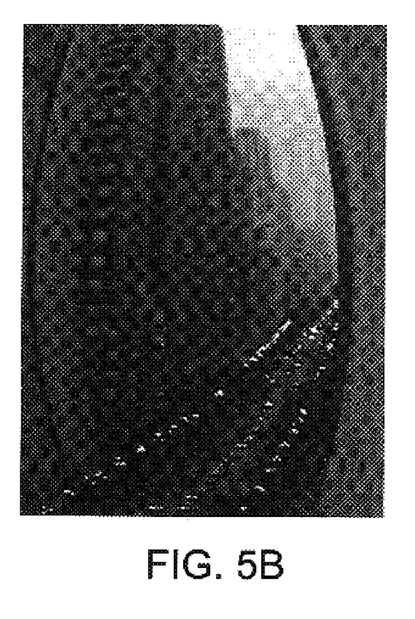
FIG. 5B is a photograph showing the image of the photograph of FIG. 5A after relativistic transformation in accordance with the present invention.

FIG. 5A shows a normal view of a street captured by a camera with a field of view of 1300. In FIG. 5B, the image of FIG. 5A has been relativistically transformed using the above described process to show the view that a virtual observer would see if the observer were moving towards the street with a velocity equivalent to 80% of the speed of light. Further, FIG. 5B has also been cropped and resized such the effective field of view is 45°.

Figure 6A:
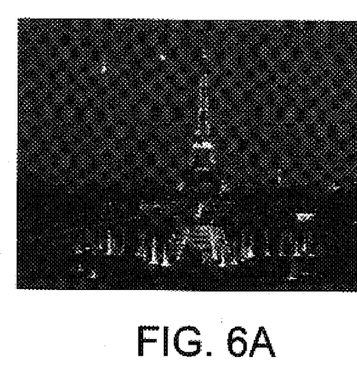
FIG. 6A is a photograph showing an image prior to relativistic transformation in accordance with the present invention.
Figure 6B:
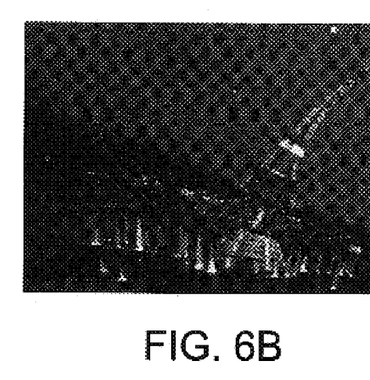
FIG. 6B is a photograph showing the image of the photograph of FIG. 6A after relativistic transformation in accordance with the present invention.

FIG. 6A shows a normal view of the Eiffel Tower captured by a camera with a field of view of 80° at an elevation angle of 40°. In FIG. 6B, the image of FIG. 6A has been relativistically transformed using the above described process to show the view that a virtual observer would see if the observer rotates his head 23° up and 44° to the right and moves laterally from left to right with a velocity equivalent to 80% the speed of light. Further, FIG. 5B has also been cropped and resized such that the effective field of view is 40°.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1]. Ping-Kang Hsiung. Visualizing Relativistic Effects. *Ph.D. Thesis*, Department of Electrical and Computer Engineering, Carnegie Mellon Univ., Pittsburgh, Pa., November 1990.

[2]. Ping-Kang Hsiung and Robert H. P. Dunn. Visualizing Relativistic Effects in Space-time. *Proceedings of Supercomputing'89 Conference*, pp.597–606, 1989.

[3]. Ping-Kang Hsiung, Robert H. Thibadeau, and Robert H. P. Dunn. Ray-Tracing Relativity. *Pixel*, pp.10–18, January/February 1990.

[4]. Ping-Kang Hsiung and Robert H. Thibadeau. Space-time Visualization of Relativistic Effects. *Proceedings of the* 1990 *ACM Eighteenth Annual Computer Science Conference*, Washington, D.C., pp.236–243, ACM, New York, February 1990.

[5]. Ping-Kang Hsiung, Robert H. Thibadeau, and Michael Wu. T-Buffer: Fast Visualization of Relativistic Effects in Space-time. *Proceedings of the* 1990 *Symposium on Interactive 3D Graphics*, pp.83–88, 1990.

[6]. Ping-Kang Hsiung, Robert H. Thibadeau, Christopher B. Cox, and Robert H. P. Dunn. Time Dilation Visualization in Relativity. *Proceedings of Supercomputer'90 Conference*, pp.835–844, November 1990.

[7]. Ping-Kang Hsiung, Robert H. Thibadeau, Christopher B. Cox, and Robert H. P. Dunn. Doppler Color Shift in Relativistic Image Synthesis. *Proceedings of the International Conference on Information Technology*, Tokyo, Japan, pp.369–377, October 1990.

[8]. Ping-Kang Hsiung, Robert H. Thibadeau, Christopher B. Cox, Robert H. P. Dunn, Paul Andrew Olbrich, and Michael Wu. Wide-Band Relativistic Doppler Effect Visualization. *Proceedings of the Visualization'90 Conference*, pp.83–92, October 1990.

[9]. Meng-Chou Chang, Feipei Lai, and Wei-Chao Chen. Image Shading Taking into Account Relativistic Effects. *ACM Transactions on Graphics*, Vol.15, No.4, pp.265–300, October 1996.

What is claimed is:

1. A computer-implemented process for simulating how at least one pixel-based image of a scene would appear when the scene is viewed at a different viewing velocity relative to the velocity at which each pixel-based image was acquired, comprising:

representing each image pixel using light rays by defining each light ray as a unit three-dimensional vector with respect to a position of each pixel within each image, a field of view of each image, a width and height of each image, and a point from which each image is captured;

transforming each light ray from an initial inertial reference frame representing a reference frame in which each pixel-based image was acquired, to a new inertial reference frame representing a reference frame in which the scene is viewed; and transforming each image by mapping the pixels to locations in the new inertial reference frame where the transformed light rays intersect a plane representing a view port.

2. The computer-implemented process of claim 1, further comprising cropping each transformed image to display a subsection of each transformed image.

3. The computer-implemented process of claim 1, further comprising changing an effective field of view for each transformed image by zooming each transformed image.

4. The computer-implemented process of claim 1, wherein each pixel-based image is a panorama.

5. The computer-implemented process of claim 1, further comprising shifting an observed frequency for each pixel of each transformed image by using a relative velocity between the initial reference frame and the new reference frame to determine a Doppler shift for each image pixel.

6. The computer-implemented process of claim 1, wherein a user provided viewing velocity is specified via a user interface.

7. The computer-implemented process of claim 1, wherein a speed represented by the viewing velocity has a user provided direction specified via a user interface.

8. The computer-implemented process of claim 1, wherein a user provided angular shift for viewing the scene is specified via a user interface.

9. The computer-implemented process of claim 1, wherein a user provided field of view for viewing the scene is specified via a user interface.

10. The computer-implemented process of claim 1, wherein the viewing velocity is any velocity up to the speed of light.

11. The computer-implemented process of claim 1, wherein the viewing velocity relative to the velocity at which each pixel based image is acquired represents a relative velocity between the initial inertial reference frame and the new inertial reference frame, and wherein a Lorentz transform uses the relative velocity for transforming each light ray from the initial inertial reference frame to the new inertial reference frame.

12. The computer-implemented process of claim 1, wherein a motion video represents each pixel-based image.

13. The computer-implemented process of claim 12, wherein the motion video is captured by an accelerating image capture device.

14. The computer implemented process of claim 13 wherein the viewing velocity relative to the velocity at which each pixel based image is acquired represents a relative velocity between the initial inertial reference frame and the new inertial reference frame, and wherein the relative velocity represents an accelerating viewing velocity proportional to the acceleration of the accelerating image capture device.

15. A system for simulating how at least one sequential pixel-based image of a scene would be viewed by an observer traveling at any desired viewing velocity, comprising:
 a general purpose computing device; and
 a computer program comprising program modules executable by the computing device, wherein the computing device is directed by the program modules of the computer program to:
  (a) represent each pixel with a corresponding light ray by defining each light ray as a unit three-dimensional vector with respect to a position of each pixel within each image, a field of view of each image, a width and height of each image, and a point from which each image is captured,
  (b) transform each light ray from an initial inertial reference frame representing each image to a new inertial reference frame representing the observer, and
  (c) map each pixel to a location in the new inertial reference frame where each corresponding light ray intersects a view port of the observer.

16. The system of claim 15 wherein the at least one sequential pixel-based image of a scene is represented by a motion film acquired by a stationary image capture device.

17. The system of claim 15 wherein the at least one sequential pixel-based image of a scene is represented by a motion film extracted from a set of sequential images acquired by a plurality image capture devices positioned along a path.

18. The system of claim 15 wherein the at least one sequential pixel-based image of a scene is represented by a motion film acquired by an image capture device having a constant velocity.

19. The system of claim 18 wherein the image capture device moves along a curved path.

20. The system of claim 15 wherein the at least one sequential pixel-based image of a scene is represented by a motion film acquired by an accelerating image capture device.

21. The system of claim 20 wherein the viewing velocity has an acceleration proportional to the acceleration of the image capture device.

22. The system of claim 21 wherein the image capture device accelerates along a curved path.

23. The system of claim 15 wherein the viewing velocity has a range from zero to the speed of light.

24. The system of claim 15, further comprising a program module for Doppler shifting each pixel mapped to the new inertial reference frame with respect to the viewing velocity relative to a velocity at which each pixel-based image was acquired.

25. A computer-readable medium having computer executable instructions for transforming at least one sequential pixel-based image, said computer executable instructions comprising:
 representing each image pixel with a light ray by defining each light ray as a unit three-dimensional vector with respect to a position of each pixel within each image, a field of view of each image, a width and height of each image, and a point from which each image is captured;
 transforming each light ray via a Lorentz Transformation between an initial inertial reference frame and a new inertial reference frame based on a relative velocity between the initial inertial reference frame and the new inertial reference frame;
 mapping each pixel to a location in the new inertial reference frame where each corresponding transformed light ray intersects a viewing plane; and
 Doppler shifting each image pixel based on the relative velocity between the initial inertial reference frame and the new inertial reference frame.

26. The computer-readable medium of claim 25 wherein transforming each light ray comprises transforming each light ray with respect to the relative velocity between the initial inertial reference frame and the new inertial reference frame.

27. The computer-readable medium of claim 25 wherein mapping each pixel to a location in the new inertial reference frame comprises locating each pixel at a point where each corresponding transformed light ray intersects a viewing plane, and wherein a space-time point from which each image was acquired is coincident with a point in the new inertial reference frame from which each image is viewed.

28. The computer-readable medium of claim 25 wherein the relative velocity between the initial inertial reference frame and the new initial inertial reference frame is a user specified relative velocity ranging from zero to the speed of light.

29. The computer-readable medium of claim 28 wherein a direction of the relative velocity between the inertial reference frames is provided via a user interface.

30. The computer-readable medium of claim 25 wherein the axes of a global coordinate system for the initial inertial reference frame are parallel to the axes of a global coordinate system for the new inertial reference frame.

31. The computer-readable medium of claim 30 wherein an origin for the global coordinate system for the initial inertial reference frame is coincident with an origin for the global coordinate system for the new inertial reference frame at an instant when each image is acquired.

32. The computer-readable medium of claim 31 wherein:
 a local coordinate system for the initial inertial reference frame is used to define the orientation of an image capture device for acquiring each image relative to the global coordinate system for the initial inertial reference frame; and a local coordinate system for the new inertial reference frame is used to define the orientation of an observer for viewing each image relative to the global coordinate system for the new inertial reference frame.

33. The computer-readable medium of claim 32 wherein transforming each light ray comprises:

transforming each light ray from the local coordinate system for the new inertial reference frame to the global coordinate system for the new inertial reference frame;

transforming each light ray from the global coordinate system for the new inertial reference frame to the global coordinate system for the initial inertial reference frame; and transforming each light ray from the global coordinate system for the initial inertial reference frame to the local coordinate system for the initial inertial reference system.

34. The computer-readable medium of claim 32 wherein each image is a panorama.

35. The computer-readable medium of claim 34 wherein the global coordinate system for the new inertial reference frame coincides with the global coordinate system for the initial inertial reference frame.

36. The computer-readable medium of claim 35 wherein transforming each light ray comprises:

transforming each light ray from the local coordinate system for the new inertial reference frame to the global coordinate system for the new inertial reference frame; and transforming each light ray from the global coordinate system for the new inertial reference frame to the local coordinate system for the initial inertial reference system.

37. The computer-readable medium of claim 25, wherein the relative velocity between the inertial reference frames represents a proportional acceleration between the inertial reference frames.

38. The computer-readable medium of claim 34 where the proportional acceleration represents acceleration along a curved path.

39. The computer-readable medium of claim 35 where the acceleration along the curved path is approximated via a series of straight-line intervals.

* * * * *